United States Patent
Savor

[15] 3,654,373
[45] Apr. 4, 1972

[54] APPARATUS FOR INITIATING THE HEAT GENERATION PHASE OF AN ELECTROSLAG REFINING PROCESS

[72] Inventor: Dennis E. Savor, Hixson, Tenn.
[73] Assignee: Combustion Engineering, Inc., Windsor, Conn.
[22] Filed: Dec. 10, 1970
[21] Appl. No.: 96,837

[52] U.S. Cl. .................................................. 13/9, 13/34
[51] Int. Cl. ............................................................ H05b 3/60
[58] Field of Search ............................................... 13/9, 9 ES, 34

[56] References Cited

UNITED STATES PATENTS 3,389,208  6/1968  Roberts et al. ........................ 13/9 ES

FOREIGN PATENTS OR APPLICATIONS 1,172,042  11/1969  Great Britain ........................ 13/9 ES Primary Examiner—Bernard A. Gilheany
Assistant Examiner—R. N. Envall, Jr.
Attorney—Carlton F. Bryant, Eldon H. Luther, Robert L. Olson, John F. Carney, Richard H. Berneike, Edward L. Kochey, Jr. and Lawrence P. Kessler

[57] ABSTRACT

Apparatus for initiating the electroslag refining process including a slag melting mold and a metal refining mold, a passageway joining the lower portion of the two molds, and means for introducing inert gas into the passageway.

1 Claim, 2 Drawing Figures

INVENTOR
DENNIS E. SAVOR

BY Robert L. Olson
ATTORNEY

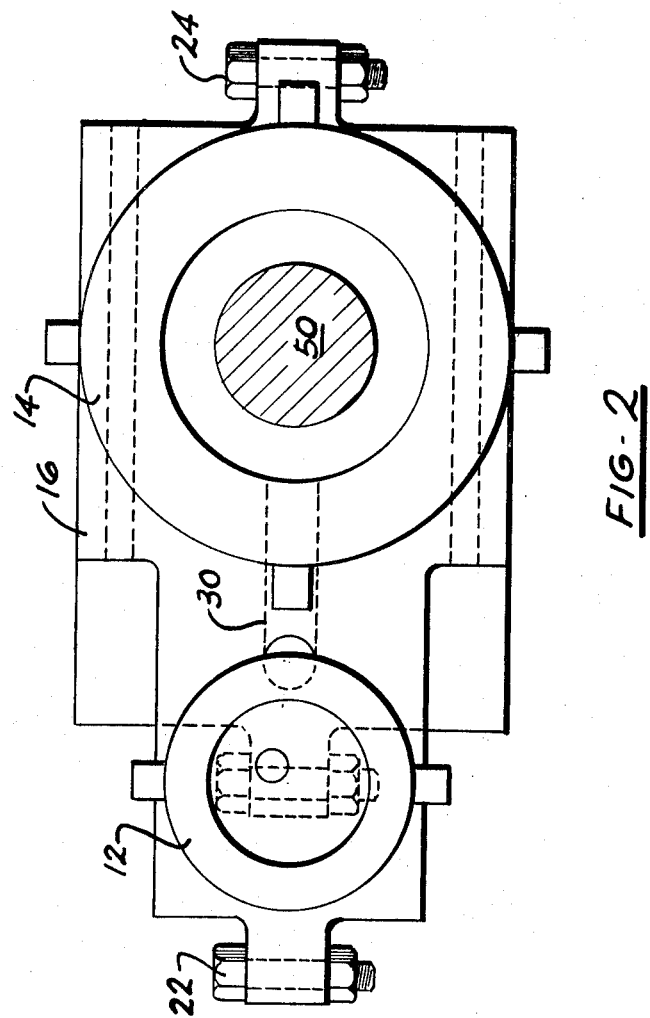

APPARATUS FOR INITIATING THE HEAT GENERATION PHASE OF AN ELECTROSLAG REFINING PROCESS

BACKGROUND OF THE INVENTION

When initiating the electroslag refining (ESR) process, there is a problem of establishing a molten flux pool. Starting difficulty is experienced when a consumable or nonconsumable electrode tries to penetrate a flux blanket which is not in a molten state. Arcing, shorting or stubbing usually occurs before a sufficient amount of flux can be melted to sustain the operation. Arcing cannot be tolerated because of rapid wear and ultimate destruction of the electrode tip. If scratch starts under a solid granulated flux are used to establish heat generation, there will almost always be voids, gas pockets, and other undesirable features in the beginning portion of the ingot. These problems are generally caused from moisture present in the unmelted flux. Dry or unmelted flux will also insulate portions of the mold stool, thereby reducing heat transfer from the bottom, impairing axial dendritic crystal growth associated with good ESR practice.

Another problem is contamination caused from oxide formations which can occur when the electrode tip is allowed to arc without proper protection from the oxygen bearing atmosphere.

Another problem encountered when transferring molten flux from a separate flux melting device to the main mold, is excessive heat loss during transit. This can happen when a process is initiated by pouring molten flux down the entire height of a refining mold in which an electrode is already in position. If the electrode is electrically hot while the flux is introduced, arcing can take place whenever the molten flux bridges the gap between the electrode and the ingot mold wall. This could damage or destroy the mold.

SUMMARY OF THE INVENTION

In accordance with my invention apparatus for initiating the heat generation phase of an electroslag refining process includes a slag melting mold and a metal refining mold, a passageway joining the lower portion of the two molds, and means for introducing inert gas into the passageway, with the molten flux serving as a power switch for the primary refining phase as it fills the metal refining mold.

BRIEF DESCRIPTION OF THE DRAWINGS

FIG. 2 is a plan view taken on lines 2—2 of FIG. 1.

DESCRIPTION OF THE PREFERRED EMBODIMENT

Figure 1:
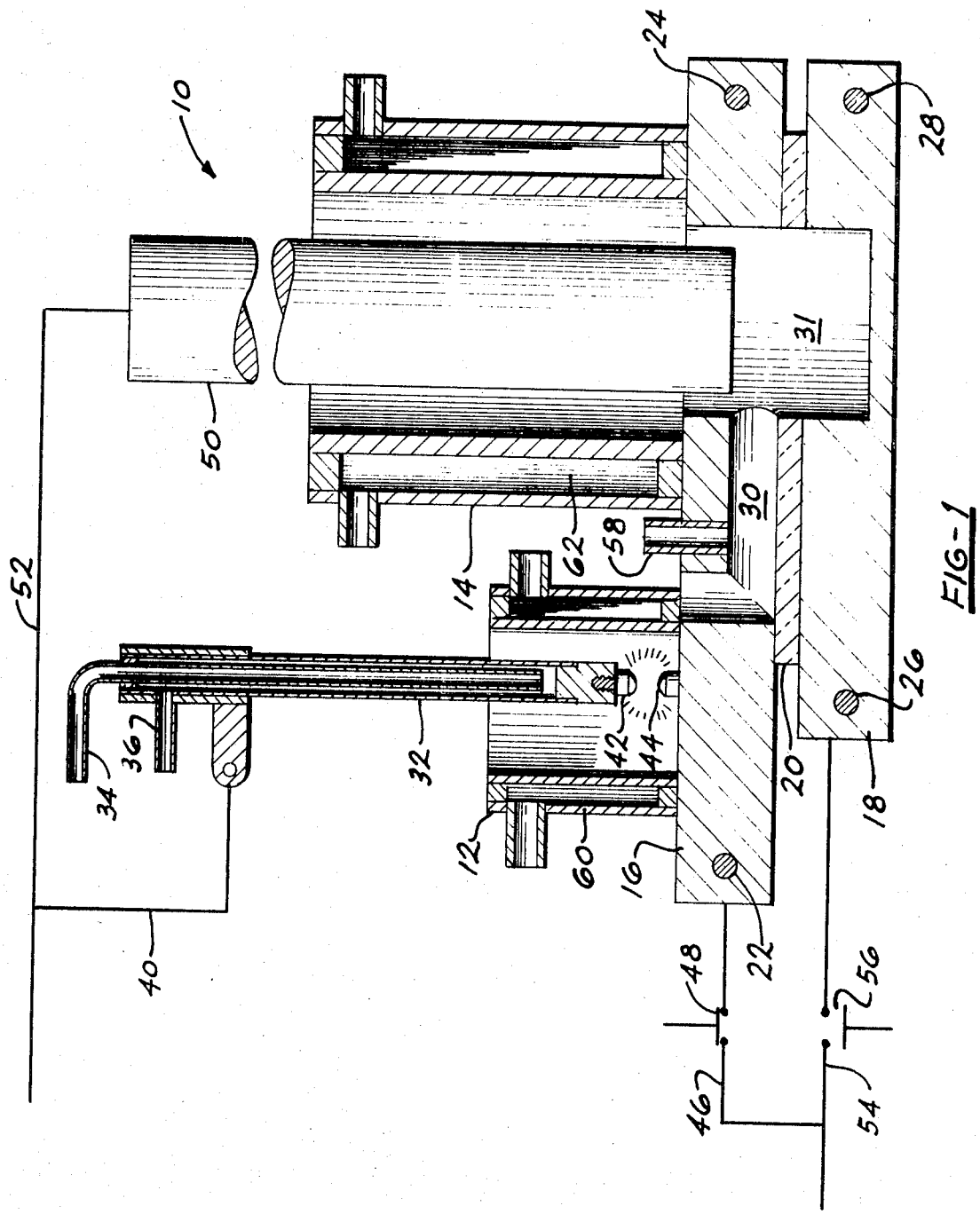
FIG. 1 is a cross-sectional side view of the initiating apparatus for electroslag refining constructed in accordance with the invention.

Looking now to FIG. 1 numeral 10 designates an electroslag refining assembly having a bottomless mold 12, which is used to melt flux. A second, larger bottomless mold 14, is for the purpose of refining metal. Mold 14 employs a slight taper, the bottom diameter being larger than the top. This is to facilitate ingot or mold removal. These two bottomless molds sit on a copper base plate 16, which is of two-piece construction, as shown in FIG. 2. Positioned beneath plate 16 is a second copper plate 18, with a sheet of refractory material 20 positioned between them. Plate 18 is also made up of two halves, as is the case of plate 16. The halves of plates 16 and 18 are secured together by nut and bolt assemblies 22, 24, 26, and 28.

Located in the upper base plate 16 is a passageway 30. This passage puts the two molds 12 and 14 in communication with each other when the flux mold 12 is moved to the right. Positioned within mold 12 is a water cooled electrode 32, having a water inlet 34 and an outlet 36. Power is supplied to the electrode through upper bus bar 40, and lower bus bar 46, which is connected to copper plate 16 through switch 48. Electrode 32 has a tungsten tip 42, and a coacting tungsten tip 44 is secured to the upper surface of plate 16.

Positioned within refining mold 14 is a consumable electrode 50. This electrode is made up of metal that is to be refined. Located beneath the mold 14 and in alignment therewith is a cavity 31, which forms a part of the overall mold cavity. Power lead 52 is connected to the electrode 50, and a second power lead 54 is connected to the lower base plate 18 through switch 56. Connected to passageway 30 is an inlet passage 58, by means of which insert gas can be introduced. The wall of mold 12 is of double-walled construction, having a cavity 60 therebetween, so that it can be water cooled during operation. Likewise, the wall of mold 14 contains cavity 62.

The operation of the metal refining initiator will now be explained. A nonconsumable electrode 32 is positioned within the flux mold 12. Flux mold 12 is purged of oxygen bearing atmosphere at this time with inert gas. An arc is initially struck between tips 42 and 44, which starts the melting action of the flux as dry granulated flux is poured into the flux mold. A suitable voltage control mechanism is used to control and maintain the arc during this phase of the operation. When a sufficient amount of flux has been melted to furnish a path for current flow, the voltage control mechanism is made inoperative and a current control mechanism is used to maintain a current discharge of proper heat balance sufficient to melt the needed volume of flux.

At this time, the consumable electrode 50 is lowered into position inside the main ingot mold 14, and simultaneously, passageway 30 and the interior of mold 14 are purged of oxygen by introducing an inert gas, such as argon, through pipe 58. The electrode is then made electrically hot, although no current will be flowing during the flux transfer phase because of the cavity space between electrode 50 and base plate 18. The base plate temperature is allowed to rise to about 300° F. This will prevent mold wall sweating, and chilling of the flux during transfer.

When the base plate is at the determined temperature, the bottomless flux mold 12 is moved to the right, thereby allowing molten flux to flow through passageway 30 to the starting cavity 31. When the molten flux bridges the gap between the consumable electrode 50 and base plate 18, a high resistance current path is established, and the heat generation phase begins. As soon as current is flowing in the refining mold, coolant circulation is established in the base plate and the ingot mold.

After the melting phase has progressed to a point where the ingot build-up is about midway up the mold 14, a fixture may be applied to the ingot mold for moving the mold up or holding it stationary. By this time, the flux or molten metal that is present in the flux passageway 30 should be solidified. The split base plates may then be dismantled by removing the nuts and bolts and splitting the two halves. The solidified flux and metal present in the flux passageway may be easily removed as the base plate is split and the passageway fully exposed.

What is claimed is:

1. The method of initiating a refining metal process including the steps of melting flux in a first mold, simultaneously filling a passageway between the first mold and a second mold full of inert gas, thereafter passing the molten flux through the passageway to the second mold in such amount that it fills the second mold to a level above the bottom end of an electrode positioned within the second mold, and thereafter melting the electrode beneath the flux, to thereby refine the metal of the electrode without exposing it to the atmosphere.

* * * * *